United States Patent [19]
Sule

[11] Patent Number: 4,711,269
[45] Date of Patent: Dec. 8, 1987

[54] SOLENOID VALVE

[76] Inventor: Akos Sule, 4 Gates Ave., Roseland, N.J. 07068

[21] Appl. No.: 756,845

[22] Filed: Jul. 18, 1985

Related U.S. Application Data

[63] Continuation-in-part of Ser. No. 318,846, Nov. 6, 1981, abandoned.

[51] Int. Cl.⁴ .................. F15B 13/044; F16K 31/06; F16K 7/00
[52] U.S. Cl. .................. 137/625.5; 137/596.17; 137/625.65; 137/870; 251/129.02; 251/129.16; 251/129.17
[58] Field of Search .......... 137/596.17, 625.5, 625.65, 137/863, 870; 251/129.02, 129.16, 129.17, 335.2

[56] References Cited

U.S. PATENT DOCUMENTS

| | | | |
|---|---|---|---|
| 2,638,307 | 5/1953 | Fortune | 251/335.2 |
| 2,702,686 | 2/1955 | Fortune | 251/335.2 |
| 2,912,006 | 11/1959 | Cooksley | 137/625.5 X |
| 2,912,009 | 11/1959 | Cooksley | 137/625.65 |
| 3,424,429 | 1/1969 | Monnich | 251/129.17 |
| 3,429,552 | 2/1969 | Huley et al. | 251/129.17 |
| 3,740,019 | 6/1973 | Kessell et al. | 251/129.17 |

FOREIGN PATENT DOCUMENTS

| | | | |
|---|---|---|---|
| 507038 | 11/1951 | Belgium | 251/335.2 |
| 1302616 | 7/1962 | France | 137/625.65 |

Primary Examiner—Gerald A. Michalsky
Attorney, Agent, or Firm—Bernard Malina

[57] ABSTRACT

A solenoid valve includes a diaphragm assembly which isolates the fluid being controlled by the valve from the solenoid cell and the armature. The diaphragm assembly includes integrally formed poppet members and sealing rings which prevent misalignment of component parts. Force is applied by the armature on the diaphragm via a force ball which provides a central force and eliminates misalignment. In an alternative embodiment the force ball is eliminated and the diaphragm assembly is connected directly to the armature.

26 Claims, 19 Drawing Figures

FIG.10A NON-ENERGIZED

FIG.9

FIG.10B ENERGIZED

SOLENOID VALVE

This application is a continuation-in-part of my pending application Ser. No. 318,846 filed Nov. 6, 1981, now abandoned.

BACKGROUND OF THE INVENTION

Recent developments in the field of computer controlled automated hydraulic and pneumatic equipment has resulted in a requirement for smaller more efficient solenoid valves which exhibit high reliability characteristics.

The prior art related to solenoid valves for control of fluids and gases includes numerous examples of devices each of which is characterized by the following construction. Conventional solenoid valves include a coil housing within which a solenoid coil is arranged so that when current is applied, a plunger, or armature is moved thereby opening or sealing an orifice. In order to prevent the fluid or gas from entering the solenoid housing, conventional solenoid valves utilize a flexible diaphragm which seals the cavity in which the solenoid coil and the plunger are mounted. During operation, when the solenoid coil is energized, the plunger bears against the diaphragm which, in turn, bears against a poppet member which seals the orifice. This poppet member usually has a conical portion, the larger base of which is larger than the orifice which is to be sealed and a cylindrical portion which slides within the orifice. In use the conical surface of the poppet member bears against the edge of the orifice thereby sealing the orifice.

The construction of conventional solenoid valves is subject to numerous deficiencies included among which is a need for careful alignment of the component parts in order to ensure that the line of action of the plunger is aligned with the poppet member in order to effect an adequate seal. This requirement leads to a need for close manufacturing tolerances on the various component parts and careful assembly procedures resulting in a relatively high unit cost. Even with close tolerance manufacture of the various components and careful assembly procedures, misalignment of the poppet member can occur, thereby resulting in leakage of the fluid and relatively low overall realiability. Even slight misalignment of the poppet member and the orifice results in an elliptical line of contact between the conical surface of the poppet member and the circular edge of the orifice requiring substantial force on the poppet member in order to deform the poppet member and the orifice seat to create a seal. This requirement for high seating force results in a need for a relatively large amount of electrical power resulting in a relatively low overall efficiency of the valve.

In a conventional solenoid valve the fluid which is controlled by the valve acts on virtually the entire diaphragm. In order to actuate the valve the solenoid coil and the armature or plunger must provide sufficient force to overcome the force of the fluid. This leads to a relatively high rate of power consumption.

Another source of malfunction in conventional solenoid valves is related to the conventional two piece construction of the diaphragm and poppet assembly. Because of the motion of these two components, the possibility of wear and degradation of the interface between the diaphragm and the poppet member exists. This wear can lead to misalignment, and ultimately failure of the diaphragm or the poppet member with the consequent failure of the entire solenoid valve.

OBJECTS OF THE INVENTION

It is a principal object of the present invention to overcome the deficiencies of the prior art by providing a solenoid valve assembly having a unitary diaphragm and poppet member.

Another object of the present invention is to provide a solenoid valve assembly which is highly reliable in operation.

Another object of the present invention is to provide a solenoid valve assembly which has relatively low power consumption.

Another object of the present invention is to provide a solenoid valve assembly which does not rely on the careful alignment of close tolerance components in order to effect a seal.

Still another object of the present invention is to provide a solenoid valve having relatively few component parts which can be easily manufactured using high volume production techniques, thereby resulting in a low unit cost.

SUMMARY OF THE INVENTION

In accordance with the present invention, there is provided a solenoid valve which utilizes a diaphragm assembly which incorporates integrally formed poppet members. The diaphragm assembly includes a pair of circular diaphragm members each of which have an integrally formed peripheral sealing ring and a centrally disposed semi-spherical poppet member. The sealing rings are received in grooves which are formed in a valve body adjacent to a valve cavity. The poppet surfaces are actuated by the armature of a solenoid to close orifices which lead, via internal passages, to ports formed in the valve body thereby controlling the flow of fluids or gases through the valve. The armature bears on a spherical force ball which, in turn, bears on the diaphragm in order to actuate the poppet surfaces. The unitary construction of the diaphragm, the sealing rings and the poppet surfaces, prevent misalignment and improper sealing. The incorporation of the force ball eliminates the effect of any misalignment problems caused by motion of the armature, thereby resulting in a solenoid valve which is extremely reliable.

In a preferred embodiment, a portion of the poppet which is adjacent to the diaphragm is undercut, thereby increasing the flexibility of the diaphragm assembly, reducing the effect of back pressure and reducing the power required by the solenoid.

In an additional embodiment a conical valve seat is provided which reduces the internal volume of the valve. In this embodiment, the force ball is eliminated and the armature is connected to a non-metalic shaft which forms part of the diaphragm assembly.

BRIEF DESCRIPTION OF THE DRAWINGS

Additional objects and advantages of the present invention will become apparent during the course of the following specification when taken in connection with the accompanying drawings in which.

DETAILED DESCRIPTION OF THE INVENTION

Figure 1:
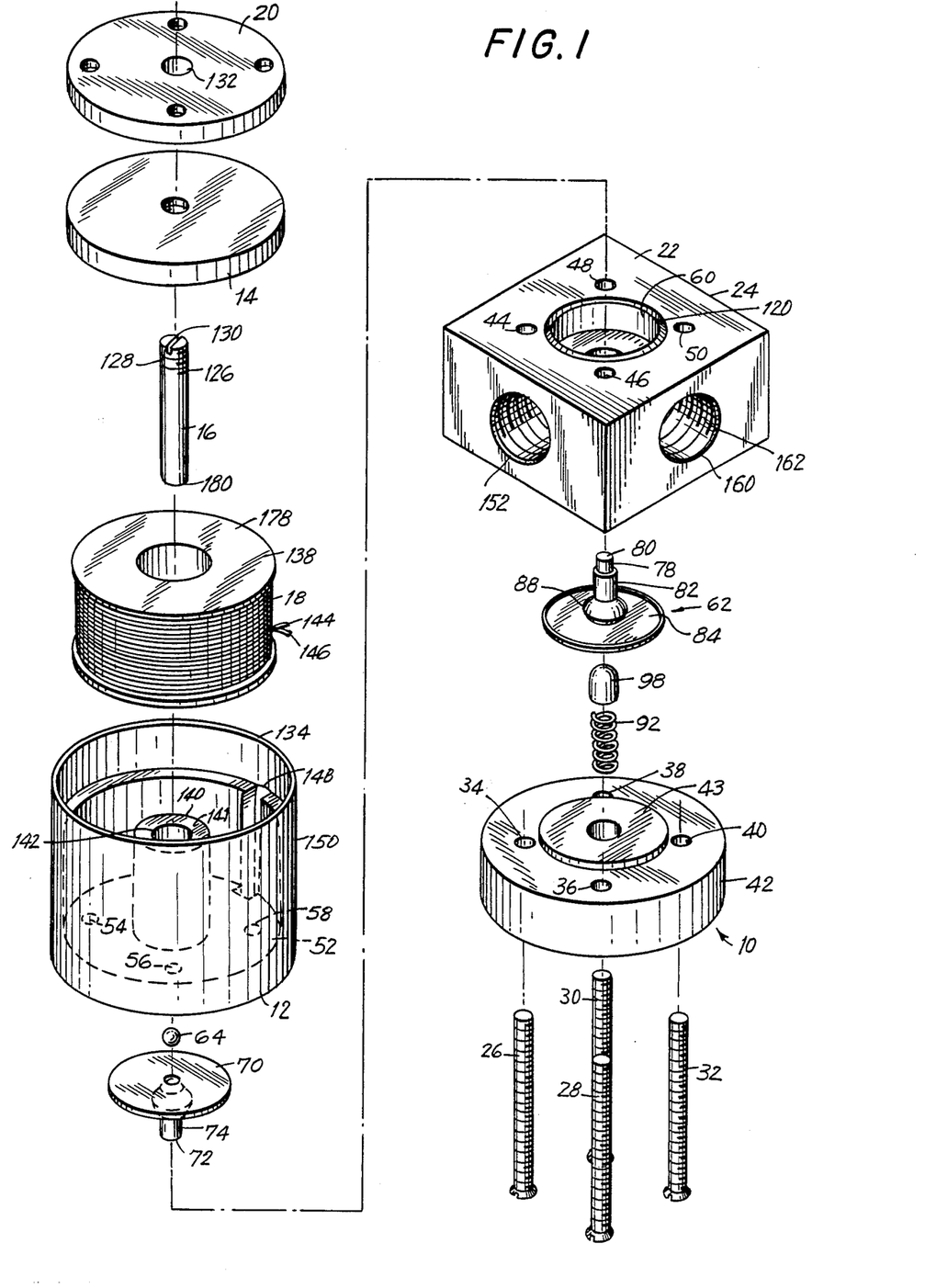
FIG. 1 is an exploded view of a solenoid valve assembly according to the present invention.
Figures 2, 3, 4:
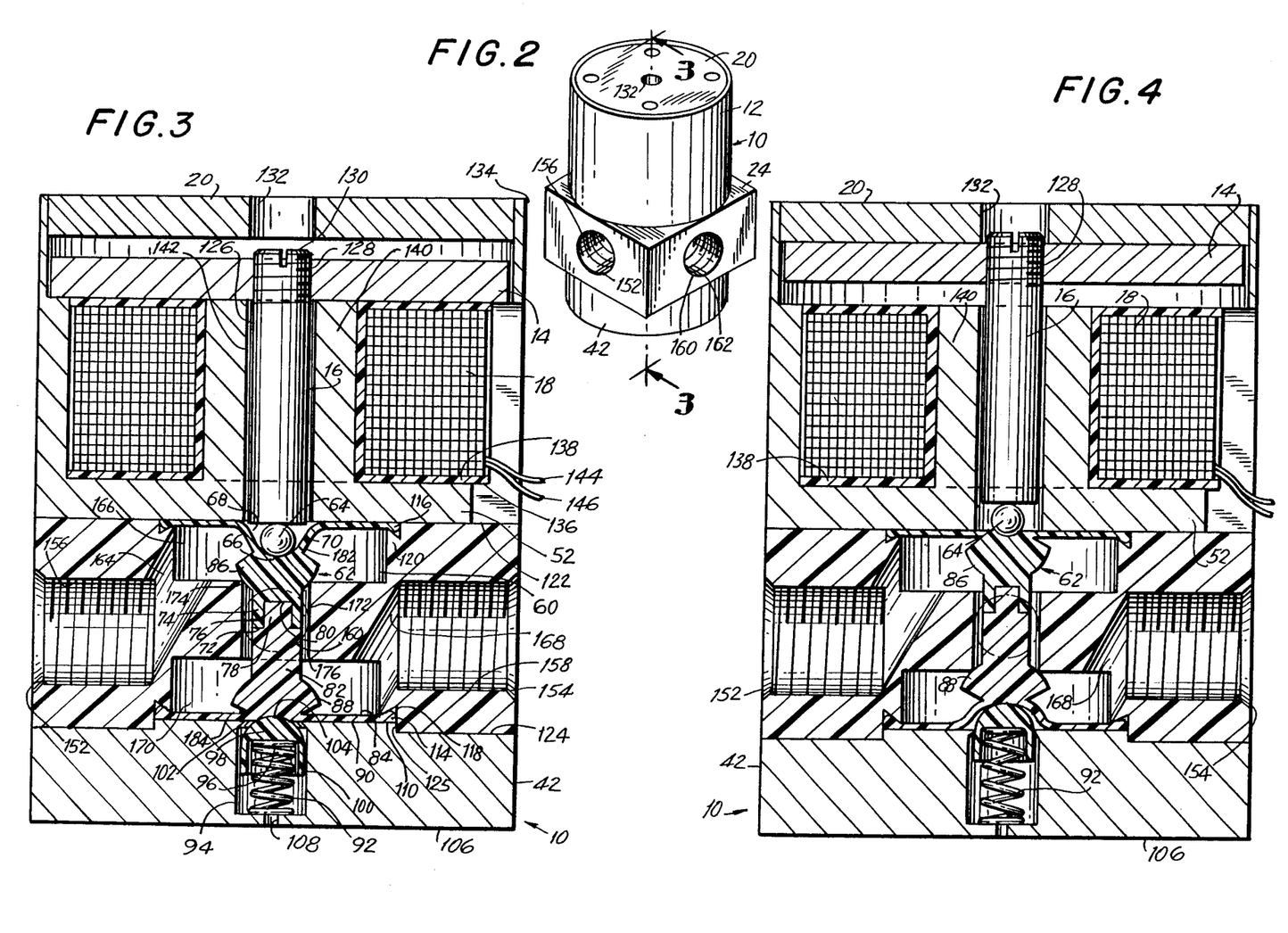
FIG. 2 is an overall perspective view of the solenoid valve assembly of FIG. 1.
FIG. 3 is a cross-sectional view, taken along the line 3—3 of FIG. 2, showing the solenoid valve assembly in the actuated state with the left port closed and the right port open.
FIG. 4 is a cross-sectional view similar to FIG. 3 showing the solenoid valve assembly in the unactuated state with the left port open and the right port closed.

With reference to the drawings, there is shown in FIGS. 1 and 2 a solenoid valve assembly 10 in accordance with the present invention which comprises a hollow solenoid housing 12 within which there is mounted a circular armature plate 14, an armature shaft 16 made of non-magnetic material, and a solenoid coil 18. The solenoid housing 12 has a housing cover 20 and is mounted on the upper surface 22 of a valve body 24 by means of four machine screws 26, 28, 30, 32, which pass through clearance holes 34, 36, 38, 40 in the bottom plate 42, clearance holes 44, 46, 48, 50 in the valve body 24, and engage four tapped holes in the pressure plate 52, which are indicated by the reference numerals 54, 56, 58, one hole not being shown.

The valve body 24 has a valve cavity 60 within which there is mounted the diaphragm assembly 62 which forms a major novel feature of the present invention.

The diaphragm assembly 62 includes a spherical force ball 64 which is seated in a centrally disposed semispherical seat 66 which is formed in the upper surface 68 of the upper diaphragm member 70. The end 72 of the shaft portion 74 of the upper diaphragm member 70 has a recess 76, shown in FIG. 3, which engages a stepped-down portion 78 located on the end 80 of the shaft portion 82 which is formed on the lower diaphragm member 84. The upper and lower diaphragm members 70, 84 each have semi-spherical poppet surfaces 86, 88, the operation of which will be described presently.

As is best shown in FIG. 3, the lower surface 90 of the lower diaphragm member 84 is urged in an upward direction by a helical compression spring 92 which is lodged in a cavity 94 formed in the bottom plate 42. The upper end 96 of the spring 92 bears against a spring seat 98 which has a cavity 100 which engages the upper end 96 of the spring 92. The upper surface 102 of the spring seat 98 has a semi-spherical configuration which lodges in a centrally located semi-spherical seat 104 which is formed in the lower surface 90 of the lower diaphragm member 84. The lower surface 106 of the bottom plate 42 has a relatively small hole 108 which communicates with the cavity 94 and enables prevailing atmospheric pressure to enter the cavity 94 and act on the lower surface 90 of the diaphragm member 84. Hole 108 also permits direct measurement of the movement of the diaphragm assembly 62 in the assembled position to thereby determine whether the proper valve opening exists.

The outer edges 110, 112 of the upper and lower diaphragm members each have integrally formed V shaped lip portions 114, 116 which fit into complementary shaped grooves 120, 118 respectively formed in the upper surface 122 and the bottom of cylindrical recess 125 formed in lower surface 124 of the valve body 24, respectively. Cylindrical recess 125 allows cylindrical projection 43 of bottom plate 42 to ensure centrally aligned application of the force of spring 92. The V shaped lip portions 114, 116 act as sealing rings and prevent any leakage of fluid from the valve cavity 60. The lip portions 114, 116 are formed concentrically with respect to the shaft portions 74, 82 and the poppet surfaces 86, 88 and the lip portions 114, 116 and thus ensure the accurate positioning of the diaphragm members 70, 84 with respect to the valve body 24.

The upper end 126 of the armature shaft 16 is connected to the armature plate 14 by means of the threaded portion 128 which includes a screw driver slot 130. The housing cover 20 has a centrally located hole 132 which permits access to screw driver slot 130 enabling assembly personnel to correlate the movement of diaphragm assembly 62 and circular armature plate 14 by adjusting the position of the non-magnetic armature shaft 16 with respect to the armature plate 14 thereby adjusting the vertical position of the armature shaft 16 and adjusting the force on the force ball 64. Accordingly, in the actuated position, spherical piston 86 of upper diaphragm 70 will form a seal with upper orifice 174 and open lower orifice 176. The housing cover is force fit into the upper end 134 of the solenoid housing 12. In order to make this adjustment it is necessary to actuate coil 18 to thereby lock armature plate 14 to solenoid housing 12 by means of the magnetic force, otherwise armature plate 14 will be free moving, thus making proper adjustment impossible.

The lower surface 136 of the solenoid bobbin 138 on which the solenoid coil 18 is wound rests on the upper surface 122 of the pressure plate 52. The pressure plate 52 has a central hub 140 portion with a central hole 142 in which the armature shaft 16 slides. The leads 144, 146 of the solenoid coil 18 leave the solenoid housing 12 through a slot 148 formed in the wall 150 of the housing 12, which is best shown in FIG. 1.

The valve body 24 has a normally open (N/O) left port 152 and a normally closed (N/C) right port 154 which have threaded portions 156, 158, respectively, and a common central port 160 which is shown in broken lines in FIG. 3. It is understood that means other than threaded portions 156, 158 may be employed to connect the valve to a particular system. The designations left port, right port and central port relate to the orientation of the solenoid valve assembly 10 as shown in FIGS. 3 and 4 and these designations have been made only as a matter of convenience. As is shown in FIGS. 1 and 2, the central port 160 has a threaded portion 162 which is similar to the threaded portions 156, 158. The left port 152 leads to an upwardly angled passage 164 which communicates with an upper portion 166 of the valve cavity 60 and the right port 154 leads to a downwardly angled passage 168 which communicates with a lower 170 portion of the valve cavity 60. The upper and lower portions 166, 170 of the valve cavity 60 are connected by a central passage 172 which also communicates with the central port 160. The diameter of the central passage 172 is somewhat greater than the diameter of the upper and lower shaft portions 74, 82. The upper edge of the central passage 172 defines an upper orifice 174 and the lower edge of the central passage defines a lower orifice 176. The poppet surface 86 is proportioned to be capable of easily seating in and sealing the upper orifice 174 and the poppet surface 88 is proportioned to be capable of easily seating in and sealing the lower orifice 176.

During operation of the solenoid valve assembly 10, when the solenoid coil 18 is energized, the armature plate 14 is drawn downward against the action of the spring 92, until it bears against the top portion 141 of central hub 140. The lower end 180 of the armature shaft 16 bears against the force ball 64 which, in turn, urges the poppet surface 86 to seal the upper orifice 174. In this state the left port 152 is closed while fluid can either enter or leave the right port 154 and pass through the passage 168, the lower portion 170 of the valve cavity 60, the central passage 172, and the central port 160.

When the solenoid coil 10 is de-energized, as is shown in FIG. 4, the spring 92 urges the lower diaphragm member 84 in a vertically upward direction and causes the poppet surface 88 to seal the lower orifice 176. In this state the right port 154 is effectively closed while fluid can either enter or leave the left port 152, and pass through the passage 164, the upper portion 166 of the valve cavity 60, the central passage 172, and the central port 160.

The semi-spherical poppet surfaces 86, 88 ensure the formation of a circular line of contact between the poppet surfaces 86, 88 and the upper and lower orifices 174, 176, even if there is some misalignment of the various components of the solenoid valve assembly 10. The possibility of misalignment is minimized by integrally forming the diaphragm surfaces 70, 84, the lips 114, 116 and the poppet surfaces 86, 88, respectively. The need for separate sealing rings to seal the diaphragm members to the valve body, as in conventional solenoid valves is eliminated, thereby eliminating a potential source of misalignment and leakage. The force ball 64 seats in the cavity 66 in the upper diaphragm member 70 and ensures the application of a central sealing force even if there is some misalignment of the armature shaft 16.

During operation, back pressure in the fluid being controlled by the solenoid valve assembly 10 will be applied by the diaphragm 70 against the pressure plate 52 and not entirely against the armature shaft 16 as in a conventional solenoid valve. This reduces the force required to be developed by the solenoid coil 18 and increases the overall efficiency of the assembly 10. When, for example, the solenoid coil 18 is energized and the upper diaphragm member 70 is flexed downward, away from the pressure plate 52, as is shown in FIG. 3, the back pressure, if any, will act only on the portion of the diaphragm 70 which leaves the pressure plate 52. In contrast, in conventional solenoid valves, the back pressure acts against the entire diaphragm area, requiring substantial actuator force to overcome the back pressure.

In order to overcome a potential problem which would exist if the size of the poppet surfaces 86, 88 were made relatively large, to accommodate a large flow rate, and consequently the radius of the portion of the diaphragm 70 which leaves the pressure plate 52 would become relatively large, an undercut portion 182, 184 is formed at the intersection of the poppet surfaces 86, 88 and the diaphragm members 70, 84. These undercut portions 182, 184 are best shown in FIGS. 3 and 4.

As is shown in FIG. 3, in the unflexed state, the undercut portions 182, 184 comprise inwardly directed extensions of the diaphragm members 70, 84. When, for example, the diaphragm member 70 is flexed, the central seat portion 66 is forced downward as is shown in FIG. 3. The undercut 182 thus reduces the overall radius of the portion of the diaphragm 70 which flexes away from the pressure plate 52 and reduces the effect of the back pressure in the fluid which is being controlled. The undercut 182 and the orifice diameter 174 may be proportioned so that the effective area of the diaphragm 70 on which the fluid back pressure acts is approximately equal to the area of the orifice 174. This results in the performance of the solenoid valve assembly 10 being the same whether or not the fluid being controlled is under pressure on a side or center port.

Figures 5, 7:
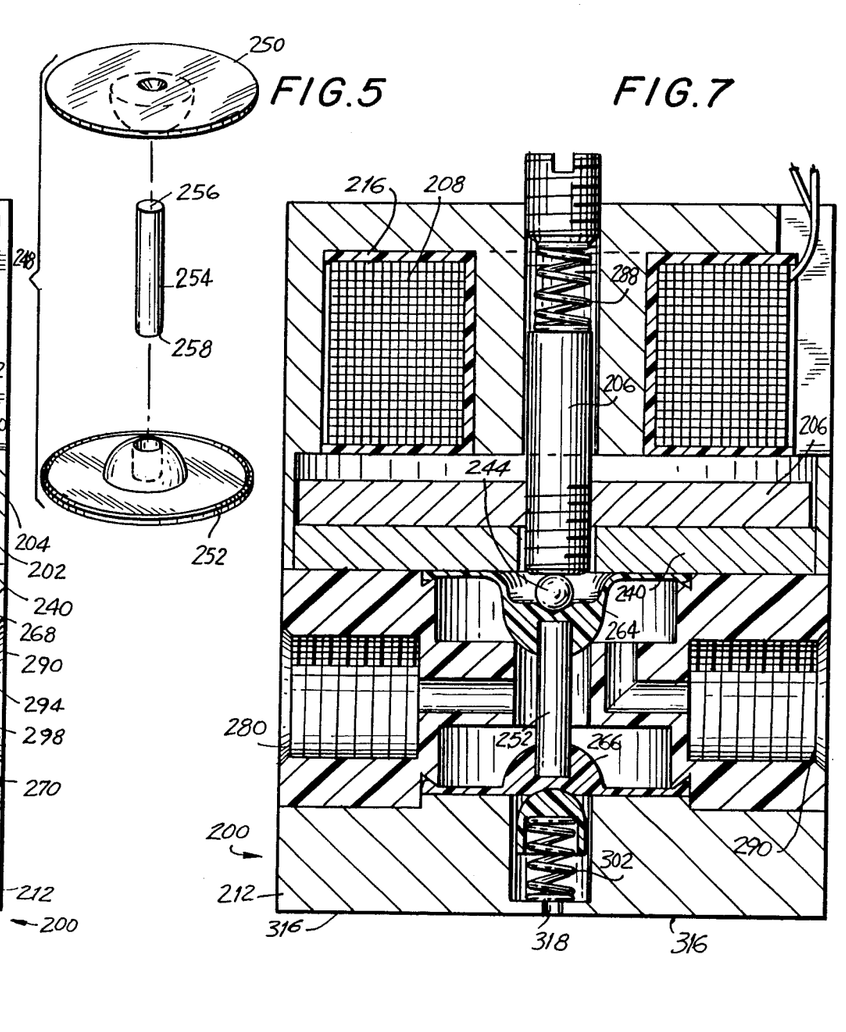
FIG. 5 is an exploded view of an alternative embodiment of the diaphragm assembly of FIG. 1.
FIG. 7 is a cross-sectional view similar to FIG. 6 showing the solenoid valve assembly in the unactivated state, with the passage of fluid between the left and right ports blocked.
Figure 6:
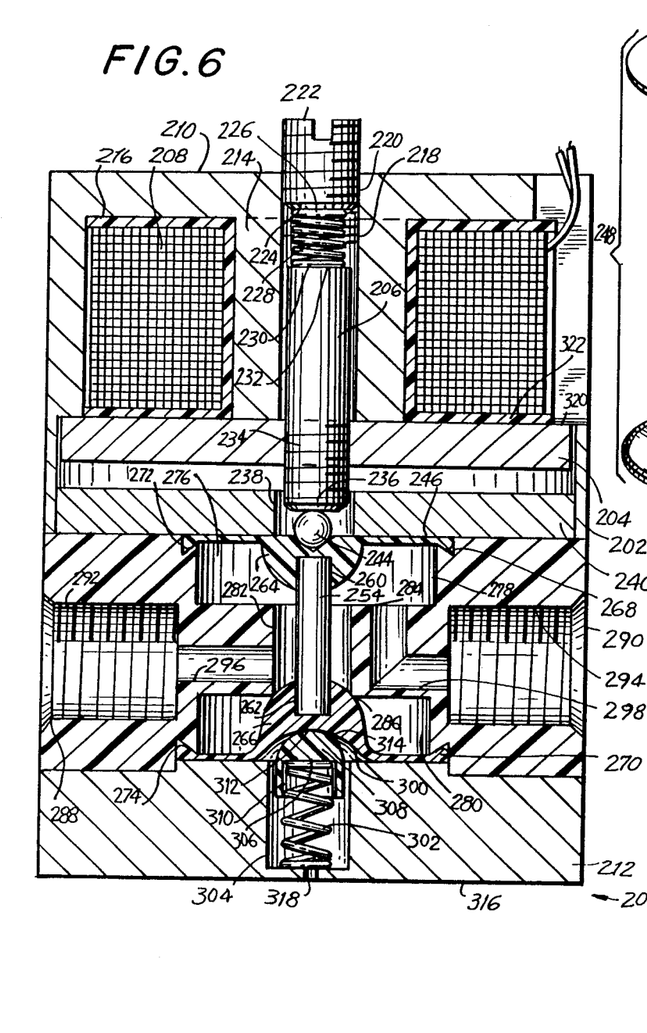
FIG. 6 is a cross-sectional view similar to FIG. 3 showing the solenoid valve assembly utilizing the embodiment of the diaphragm assembly of FIG. 5 and showing the solenoid valve assembly in the actuated state with the upper orifice open and the lower orifice closed, and with free passage of fluid between the left port and the right port.

An alternative embodiment 200 of the invention is shown in FIGS. 5, 6 and 7 and includes a solenoid housing 202 within which there is mounted an armature plate 204, an armature shaft 206 and a solenoid coil 208. The solenoid housing 202 has an integrally formed cover 210 and is mounted on a valve body 212 in a manner similar to the solenoid housing 52 of the primary embodiment 10 of the invention, shown in FIG. 1. The cover 210 includes an integrally formed hub portion 214 which projects into the hollow portion of the solenoid coil bobbin 216. The hub 214 has a central aperture 218 within which the armature shaft 206 slides. The cover 210 has a centrally located threaded hole 220 in which an adjustment screw 222 is mounted. The bottom 224 of the adjustment screw 222 bears on the top 226 of a helical compression spring 228, the bottom 230 of which rests on the top 232 of the armature shaft 206. The lower portion 234 of the armature shaft 206 is threaded and is connected to the armature plate 204. The lower end 236 of the armature shaft 206 projects through a hole 238 in a pressure plate 240 and bears on a force ball 242 which rests in a conical depression 244 formed in the center of the upper surface 246 of the diaphragm assembly 248.

The diaphragm assembly 248 is generally similar to the diaphragm assembly 62 which was previously described, with the exception that the diaphragm assembly 248 comprises an upper diaphragm member 250, a lower diaphragm member 252, and a central shaft 254. The upper and lower ends 256, 258 of the shaft 254 fit into holes 260, 262 formed in the upper and lower semi-spherical poppet surfaces 264, 266, respectively. The upper and lower diaphragm members 250, 252 include sealing lips 268, 270 which are similar to the sealing lips 114, 116 which have been previously described. The undercut portions 182, 184 previously described on diaphragm assembly 62 are eliminated on the diaphragm assembly 248.

The valve body 212 is generally similar to the valve body 24 and includes grooves 272, 274 which are complementary in shape to the sealing lips 268, 270. A valve cavity 276 is formed in the valve body 212 and includes an upper cavity portion 278, a lower cavity portion 280 and a control passage 282 which communicates with the upper and lower cavity portions 278, 280 and which has a diameter which is larger than the shaft 254. The intersections between the central passage 282 and the upper and lower cavity portions 278, 280 form upper and lower orifices respectively 284, 286. The poppet surfaces 264, 266 are proportioned so that they are capable of easily seating in and sealing the orifices 284, 286 respectively, in the manner which has been previously described. The valve body 212 has a left port 288 and a right port 290 which have theaded portions 292, 294. The designations left port and right port relate to the orientation of the solenoid valve assembly 200 shown in FIGS. 6 and 7 and these designations have been made only as a matter of convenience. The left port 288 has a straight passage 296 which communicates with the central passage 282 and the right port 290 has a right angle passage 298 which communicates with the new upper cavity portion 278.

In a manner similar to that which has been previously described, the lower surface 300 of the lower diaphragm member 252 is urged in an upward direction by a helical compression spring 302 which is lodged in a cavity 304 formed in the bottom plate 212. The upper end 306 of the spring 302 bears against a spring seat 308 which is similar to the spring seat 98 and which has a cavity 310 which engages the upper end 306 of the spring 302. The upper surface 312 of the spring seat 308 has a semi-spherical configuration which lodges in a centrally located semi-spherical seat 314 which is formed in the lower surface 300 of the lower diaphragm member 252. The lower surface 316 of the bottom plate 212 has a small hole 318, similar to the hole 108, which communicates with the cavity 304 and which enables atmospheric pressure to enter the cavity 304 and act on the lower surface 300 of the lower diaphragm member 252 and permit direct measurement of the movement of the diaphragm assembly 248 in the assembled position.

When the solenoid coil 208 is energized, the armature plate 204 is drawn upward, against the action of the spring 228 until it bears against the step 320 in the solenoid housing 202, and the hub 214 as is shown in FIG. 6. The spring 302 urges the lower diaphragm member 252 in a vertically upward direction to seal the lower orifice 286. In this state fluid can flow into or out of the left port 288 through the passage 296, through the central passage 282, through the upper cavity portion 278, through the passage 298, and then through the right port 290.

When the solenoid coil 208 is deenergized, the spring 228 forces the armature shaft 206 downward and the lower end 258 of the armature shaft 206 urges the force ball 244 to flex the upper diaphragm member 250 in a downward direction and causes the poppet surface 264 to seal the upper orifice 284. In this state the fluid cannot flow between the right and left ports 288, 290.

Figures 8, 9, 10A, 10B:
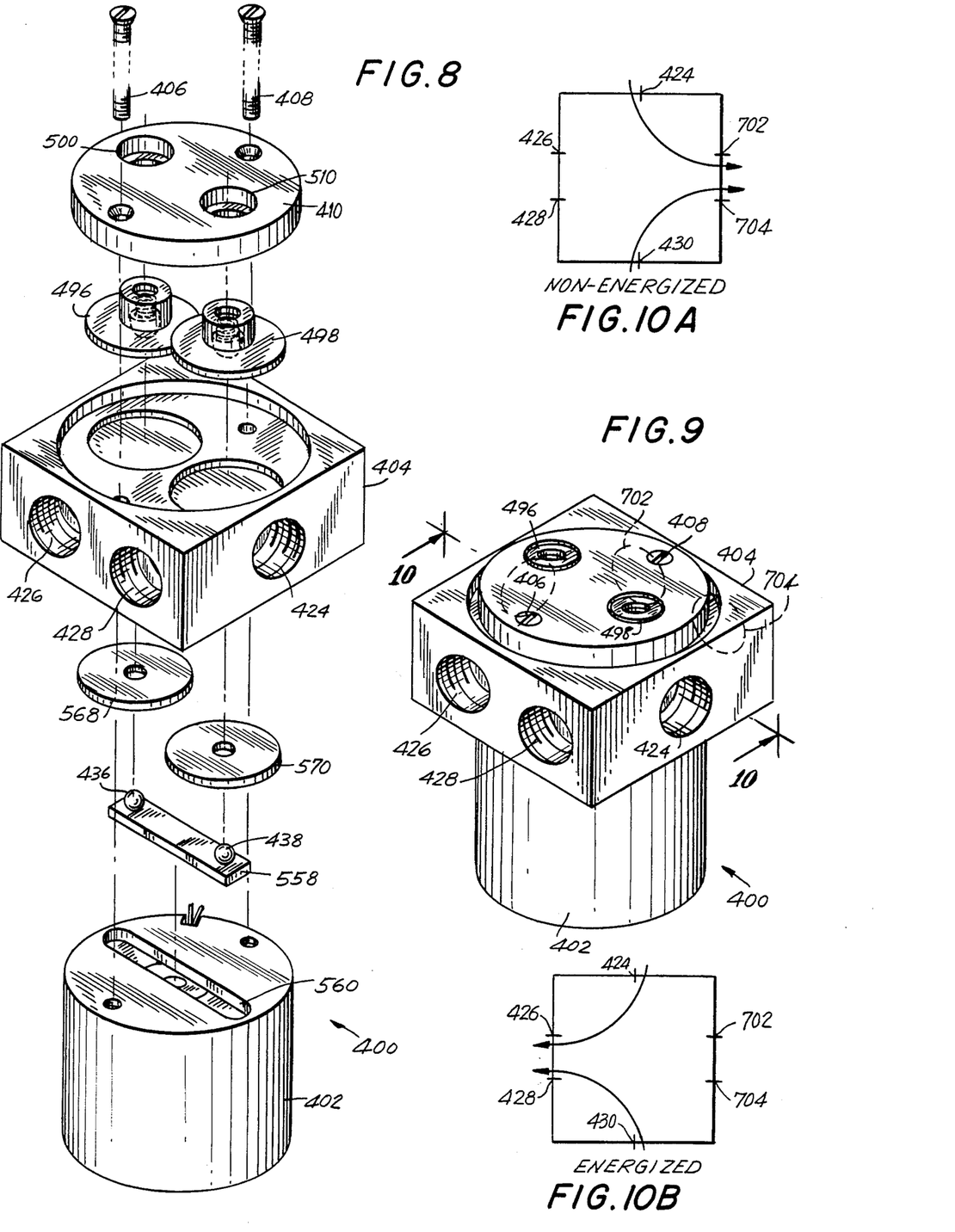
FIG. 8 is an exploded view of a second alternative embodiment of the invention incorporating a pair of valve cavities and a pair of diaphragm assemblies.
FIG. 9 is an overall perspective view of the solenoid valve of FIG. 8.
FIG. 10A is a schematic flow diagram of an alternative version of the solenoid valve of FIG. 8 shown in the non-energized state.
FIG. 10B is a schematic flow diagram similar to FIG. 10A with the solenoid valve shown in the energized state.
Figure 10:
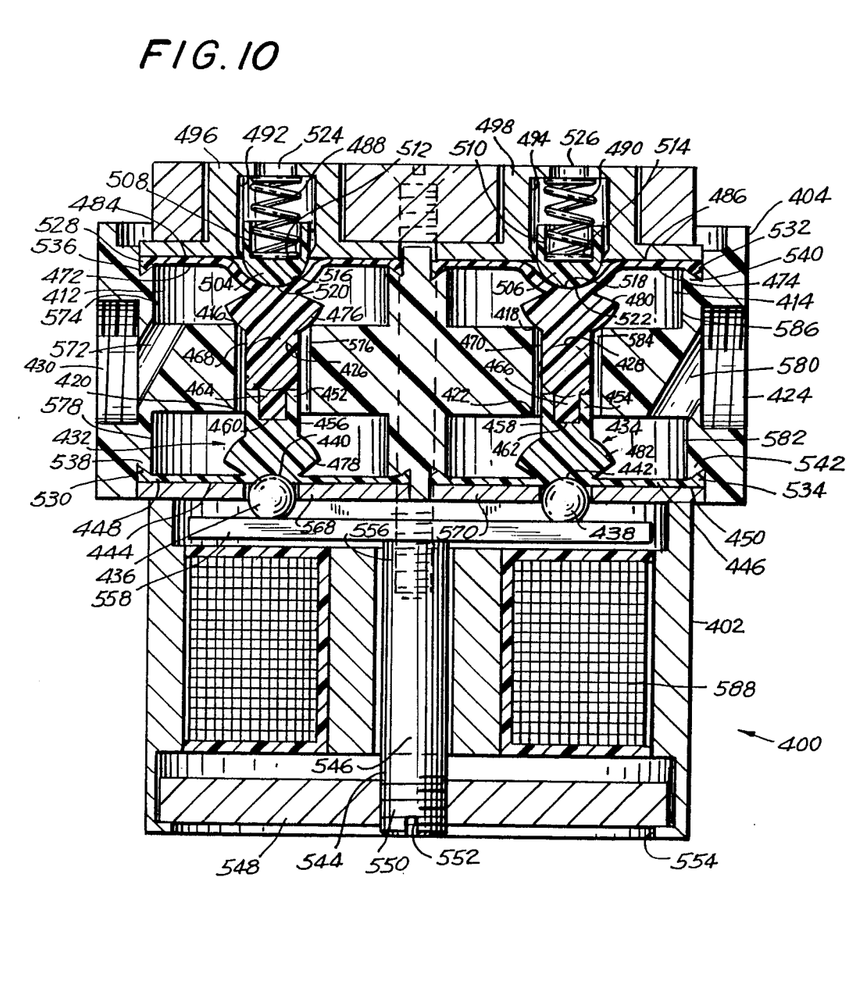
FIG. 10 is a cross-sectional view taken along the line 10—10 in FIG. 9.

A second alternative embodiment of the invention 400 is shown in FIGS. 8 through 10 and includes a solenoid housing 402 which is mounted on a valve body 404 by means of a pair of screws 406, 408 which pass through a top plate 410. As is best shown in FIG. 10, the valve body 404 includes a pair of valve cavities 412, 414 which have upper orifices 416, 418 and lower orifices 420, 422, respectively. The valve cavities 412, 414 are connected to the exterior of the valve body 404 via the ports 424, 426, 428 and 430. Mounted, one each, within the valve cavities 412, 414 there are a pair of diaphragm assemblies 432, 434 each of which is generally similar to the diaphragm assembly 62 of the primary embodiment of the invention 10, which is shown in FIG. 1. The diaphragm assemblies 432, 434 each include a spherical force ball 436, 438 which is seated in a centrally located semi-spherical seat 440, 442 formed in the lower surfaces 444, 446 of the lower diaphragm members 448, 450. The support means for the force balls 436, 438 will be described presently. The ends 452, 454 of the shaft portions 456, 458 of the lower diaphragm members have recesses 460, 462 which engage stepped down portions 464, 466 located on the shaft portions 468, 470 of the upper diaphragm members 472, 474. The upper and lower diaphragm members 448, 450, 472, 474 each have semi-spherical poppet surfaces 476, 478, 480, 482, the operation of which are similar to the operation of the poppet surfaces 86, 88, which has been previously described.

As is best shown in FIG. 10, the upper surfaces 484, 486 of the upper diaphragm members 472, 474 are urged in a downward direction by helical compression springs 488, 490. The springs 488, 490 are lodged in cavities 492, 494 which are formed discs 496, 498 which fit into holes 500, 510 in the top plate 410. The springs 488, 490 bear against spring seats 504, 506 each of which has a cavity 508, 510 which engages the lower ends 512, 514 of the springs 488, 490. The lower surfaces 516, 518 of the spring seats 504, 506 each have a semi-spherical configuration which lodge in centrally located semi-spherical seats 520, 522 which are formed in the upper surfaces 484, 486 of the upper diaphragm members 472, 474. The discs 496, 498 each have a relatively small hole 524, 526 which communicate with the cavities 492, 494 and which permit prevailing atmospheric pressure to act on the upper surfaces 484, 486 of the diaphragm members 472, 474 and permit direct measurement of the movement of the diaphragm assemblies 432 and 434.

As previously described, the outer edges of the upper and lower diaphragm members 448, 450, 472, 474 each have integrally formed V shaped lip portions 528, 530, 532, 534 which fit into complementary shaped grooves 536, 538, 540, 542 formed in the valve body. The V shaped lip portions 528, 530, 532, 534 act as sealing rings and prevent any leakage of fluid from the valve cavities 412, 414. The lip portions 528, 530, 532, 534 are formed concentrically with respect to the shaft portions 468, 470 and the poppet surfaces 476, 478, 480, 482 and thus ensure the accurate positioning of the diaphragm assemblies 432, 434 with respect to the valve body 404.

The lower end 544 of the armature shaft 546 is connected to the armature plate 548 by means of the threaded portion which includes a screwdriver slot 552. The solenoid housing 404 has a central hole 554 which enables an operator to insert a screwdriver blade in the slot 552 to rotate the armature shaft 546 with respect to the armature plate 548, thereby adjusting the vertical position of the armature shaft 546 and the force on the force balls 436, 438 in a manner similar to that which has been previously described.

The upper end 556 of the armature shaft 546 bears against a rectangular pressure plate 558 on which the spherical force 436, 438 balls are attached. The pressure plate 558 slides within a slot 560 formed in the upper portion 562 of the solenoid housing 402. The force balls 436, 438 each fit through a centrally disposed hole 564, 566 in a circular force plate 568, 570 and act upon the lower surfaces 444, 446 of the diaphragm assemblies 432, 434.

As is best shown in FIG. 10, the port 430 communicates with the port 426 via the passage 572, the upper portion 574 of the valve cavity 412 and the central passage 576. The central passage 576 also leads to the lower portion 578 of the valve cavity 412. The port 524 communicates with the port 428 via the passage 580, the lower portion 582 of the valve cavity 414 and the central passage 584. The central passage 584 also communicates with the upper portion 586 of the valve cavity 414.

When the solenoid 588 is non-actuated, as is shown in FIG. 10, the compression springs 488, 490 urge the spring seats 504, 506 in a downward direction and cause the poppet portions 476, 480 to close the orifices 416, 418. The poppet portions 478, 482 are also urged in a downward direction thereby opening the orifices 420, 422. In the non-actuated state the solenoid valve permits flow between the ports 424, 428 and prevents flow between the ports 430, 426. In the actuated state, the solenoid 588 is energized and the armature plate 548 is drawn upward against the action of the springs 488, 490. The pressure plate 558 urges the force balls 436, 438 against the diaphragm members 448, 450 and the poppet surfaces 478, 482 close the orifices 420, 422, respectively, and the poppet surfaces 476, 480 are lifted away from, and thereby open, the orifices 416, 418, respectively. In the actuated state, the solenoid valve 400 permits flow between the ports 430, 426 and prevents flow between the ports 424, 428.

Figure 11:
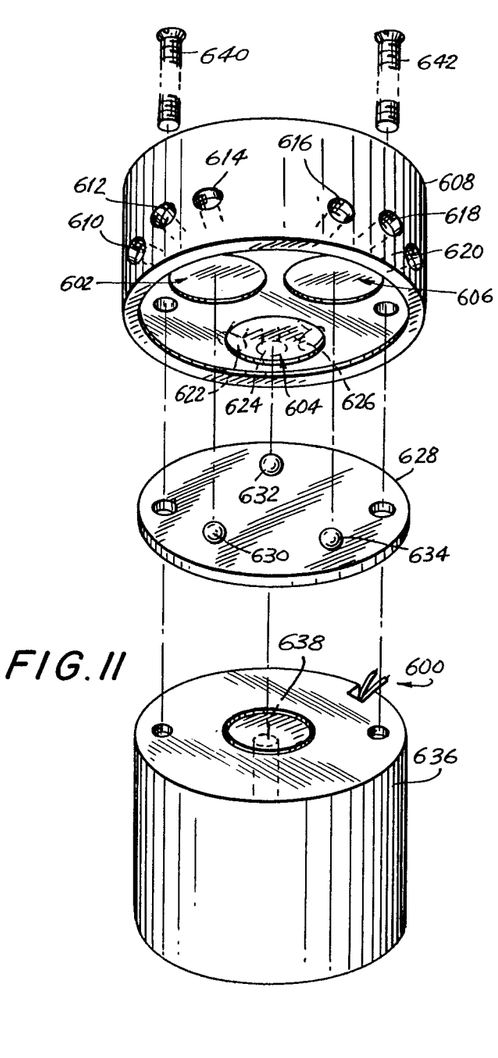
FIG. 11 is an exploded view of a third alternative embodiment of the invention incorporating three valve cavities and three diaphragm assemblies.
Figure 12:
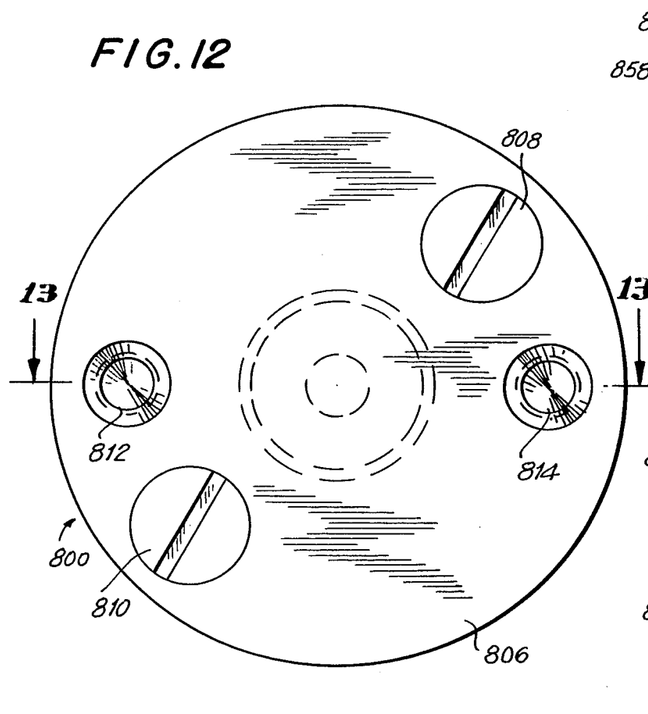
FIG. 12 is a bottom view of another embodiment of the invention showing a normally closed valve.

FIG. 11 shows a third embodiment of the invention 600 which incorporates three diaphragm assemblies 602, 604, 606 each of which is similar to the diaphragm assemblies 432, 434 of FIG. 10 and which are not shown in FIG. 11. The solenoid valve 600 of FIG. 11 is characterized by having an upper member 608 which has a total of nine ports 610, 612, 614, 616, 618, 620, 622, 624, 626 grouped in three groups of three each. Each group of ports leads to internal passages and valve cavities which are substantially identical to the internal passages and valve cavities of FIG. 1 and which are not shown. In FIG. 11, the rectangular pressure plate 558 of FIG. 10 is replaced by a circular pressure plate 628 on which three force balls 630, 632, 634 are mounted, one for each diaphragm assembly 602, 604, 606. When the solenoid (not shown) which is mounted in the solenoid housing 636 is actuated, the pressure plate 628 is acted upon by an armature member 638 which is shown in broken lines and the force balls 630, 632, 634 act upon the diaphragm assemblies 602, 604, 606 to open and close the various orifices in the manner which has been previously described. When the solenoid is non-actuated compression spring members act on the diaphragm assemblies 602, 604, 608 also as been previously described. The solenoid housing 636 is mounted on the upper member 608 by means of the screws 640 and 642.

In the non-actuated state, the solenoid valve 600 permits flow between ports 610, 612, between ports 616, 618, and between ports 622, 624 and prevents flow between all other ports. In the non-actuated state, the solenoid valve 600 permits flow between ports 610, 614, between ports 616, 620 and between ports 622, 626 and prevents flow between all other ports.

In another version 700 of the second embodiment of the invention, a second pair of ports is formed in the valve body 404 as is indicated by the broken lines 702, 704 in FIG. 9. The internal connection of the ports 424, 430, 427, 428, 702, 704 in this version of the second embodiment of the invention will be explained with reference to FIG. 10 and schematic valve flow diagrams FIGS. 10A and 10B. The port 424 communicates with the central passage 584. The port 428 communicates with the upper portion 586 of the valve cavity 414, and the port 704 communicates with the lower portion 582 of the valve cavity 414. In a similar manner, the port 430 communicates with the central passage 576. The port 426 communicates with the upper portion 574 of the valve cavity 414 and the port 702 communicates with the lower portion 578 of the valve cavity 412. The ports 430, 704 and the ports 424, 702 form two independent normally open flow paths as indicated in FIG. 10A. The ports 430, 428 and 426 form two independent normally closed flow paths.

Another embodiment of the invention 800 is shown in FIGS. 12-17. The embodiment 800 is a normally closed solenoid valve which comprises a valve body 802 which is mounted between a top plate 804 and a bottom plate 806 by means of two machine screws 808, 810 which engage tapped holes in the top plate 804. The bottom plate 806 also includes two tapped holes 812, 814 which may be used to mount the solenoid valve 800 in a desired location. The valve body 802 and the top 804 and bottom plates 806 are each generally cylindrical in configuration.

Figure 13:
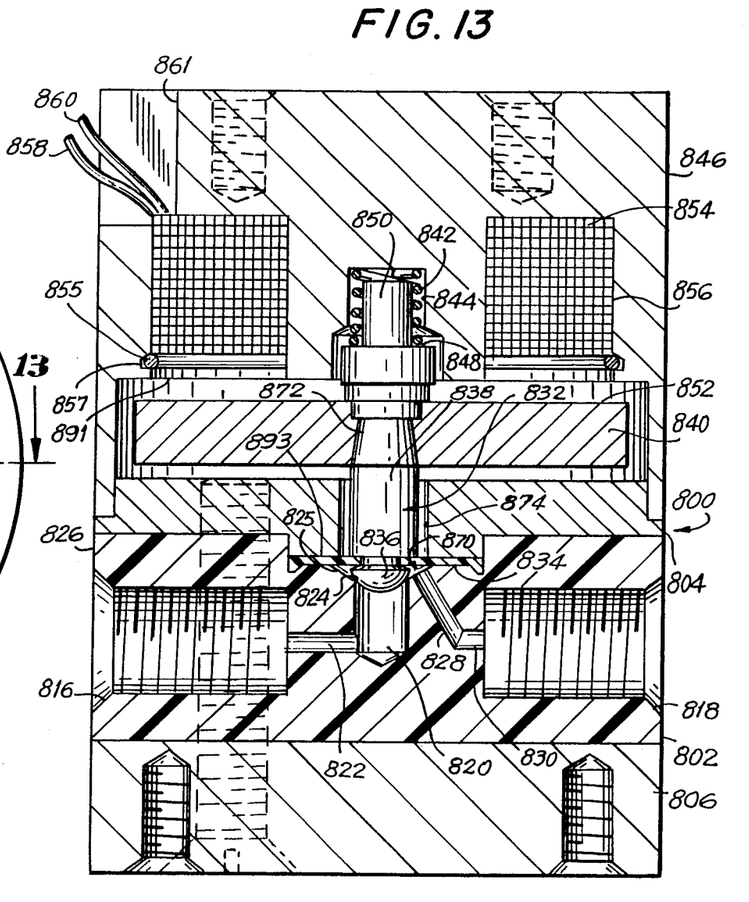
FIG. 13 is a cross-sectional view, taken along the line 13—13 of FIG. 12.
Figure 14:
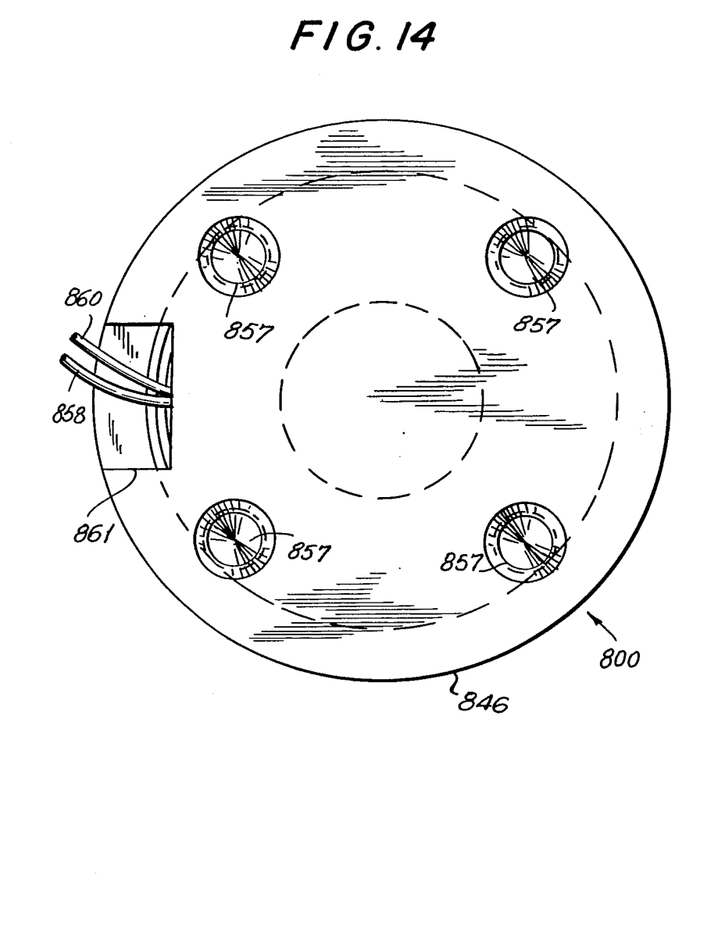
FIG. 14 is a top view of the embodiment of FIG. 12.

The valve body 802 includes a left port 816 and a right port 818. The designations left port 816 and right port 818 relate to the orientation of the solenoid valve assembly 800 as shown in FIG. 13 and these designations have been made only as a matter of convenience. The left port 816 communicates with a central bore 820 via a conduit 822. The central bore 820 communicates with a valve cavity 870 which is formed in the upper portion 826 of the valve body 802 and which forms a novel feature of the invention.

The right port 818 communicates with the valve cavity 870 by means of an angled conduit 828 which leads to a horizontal conduit 830. Valve seat 824 is formed by the intersection of tapered portion 825 of valve cavity 870 and central bore 820.

A unitary diaphragm member 832 is provided which includes a diaphragm portion 834, a poppet portion 836, and a shaft portion 838. The shaft portion 838 is connected to an armature disk 840 in a manner which will be presently described and which forms a novel feature of the invention. The armature disk 840 is urged downward by a helical spring 842 which is lodged in a cavity 844 formed in a solenoid housing 846 which is mounted on the top plate 804. The lower end 848 of the helical spring 842 bears on a spring seat member 850 which in turn bears on the top 852 of the armature disk 840. The downward motion of the armature disk 840 causes the poppet portion 836 to come into contact with the valve seat 824 thereby preventing flow between the left 816 and right 818 ports and closing the solenoid valve 800. The solenoid valve 800 remains in the closed position until a solenoid coil 854 which is lodged in a cavity 856 in the solenoid housing 846 is electrically energized via the leads 858, 860, thereby drawing the armature disk 840 upward and moving the poppet portion 836 away from the valve seat 824. The solenoid coil 854 is held in place by a retaining ring 855 which is lodged in a groove 857 formed in the solenoid housing 846. The leads 858, 860 pass through an aperture 861 which is formed in the solenoid housing 846. The solenoid housing 846 also includes four tapped holes 857 shown in FIG. 14 which may be used to mount the solenoid valve 800 in a desired location to facilitate heat transfer from the solenoid to the chassis.

Figure 15:
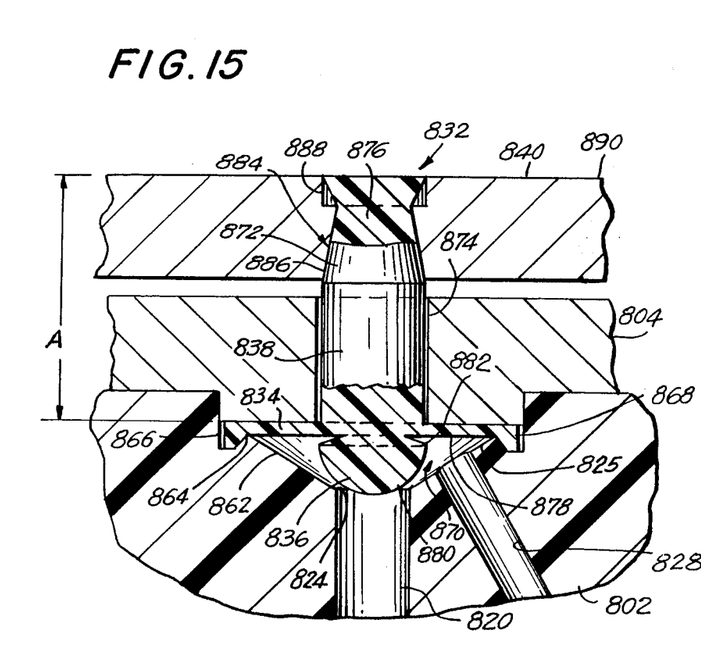
FIG. 15 is a fragmentary cross-sectional view similar to FIG. 13 drawn to an enlarged scale, showing details of internal construction with the valve shown in the open position.

The valve seat 824 and the diaphragm member 832 are best shown in FIG. 15 and the valve cavity 870 comprises a conical portion 862 which communicates with the central bore 820. The outer edge 864 of the conical portion 862 leads to a V-shaped groove 866 which is formed in the valve body 802. The groove 866 accepts a V-shaped lip 868 which is formed on the diaphragm portion 834. The shape of the valve cavity 870 in combination with the diaphragm member 832, which will be presently described in detail, reduces the internal volume of the cavity 870 of the solenoid valve 800 and increases the reliability of the valve by increasing the contact area between the poppet portion 836 and the valve seat 824, thereby reducing the contact stress and improving the useful life of the unit. Furthermore, this design serves to reduce the degree of deformation of valve seat 824 during operation of the valve.

Figure 16:
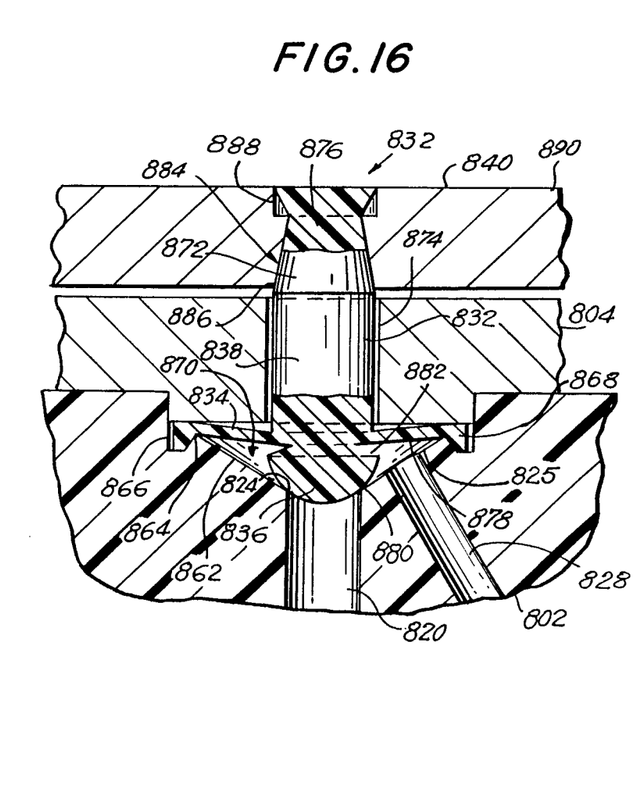
FIG. 16 is a view similar to FIG. 15 with the valve shown in the closed position.

As is best shown in FIGS. 15 and 16, the shaft portion 838 of the diaphragm member 832 projects upward from the diaphragm portion 834 and includes an inwardly tapered portion 872. The shaft portion 838 passes through a clearance hole 874 formed in the top plate 804 and the upper portion 876 of the shaft is connected to the armature. The poppet portion 836 projects downward from the lower surface 878 of the diaphragm disk 834 and includes a spherical portion 880. The poppet portion 836 also includes a conical undercut 882 formed at the interesection between the poppet portion 836 and the diapraghm disk 834.

The diaphragm member 832 is made of a plastic material having the required properties of strength, flexibility, and toughness. A plastic material which has been found to possess the required combination of physical properties is sold under the tradename Teflon. Other materials having these required properties may also be used.

As is shown in FIG. 16, the diaphragm portion 834 is deformed in the closed position and the diaphragm portion 834 leaves the top plate 804 to the extent of the movement of the poppet portion 836. FIG. 15 also shows the solenoid valve 800 in the open position. In the open position, the diaphragm portion 834 is undeformed and is fully in contact with the top plate 804.

The armature 840 has a central bore 884 which includes an inwardly tapered portion 886 and a counterbored portion 888. The inwardly tapered portion 886 of the bore 884 and the tapered portion of the shaft 838 are proportioned so that, when assembled, there is a force fit between the armature 840 and the shaft 838. During assembly, the tapered upper end 876 of the shaft 838 is introduced into the inwardly tapered portion of the bore 884 and the armature 840 is pressed downward onto the shaft 838 until a critical height is reached. This critical height is a preselected precise dimension as described below between the diaphragm portion 834 to the top of the armature 840. This dimensional relationship is shown as the reference letter A in FIG. 15. As the armature 840 is pressed onto the shaft 838, the shaft portion 876 is compressed. The shaft portion 876 which is in the area of the counterbored portion 888, having been compressed by the tapered portion of the armature 840, expands into the counterbored portion 888, thereby locking the shaft portion 838 and the armature 840 together. The top of the shaft is then cut off flush with the top 890 of the armature 840. Although formed of dissimilar materials, the armature 840 and the diaphragm member 832 thus form a simple and reliably connected assembly which is easily assembled to form a preselected precise dimensional relationship between the diaphragm portion 834 and the top 890 of the armature. The dimension A in FIG. 15 is set during assembly to be identical to the distance between the surface 891 on the solenoid housing 846 and the surface 893 on the top plate 804. This allows the full amount of travel of the diaphragm member 832 and the poppet portion 836.

The precise dimensional relationship between the diaphragm portion 834 and the top 890 of the armature 840 facilitates operation of the solenoid valve 800 with limited travel of the diaphragm member 832. This limited travel of the diaphragm member 832 allows the solenoid valve 800 to operate at relatively high pressures without the danger of rupturing the diaphragm portion 834. This is accomplished through the use of the top plate 804 which supports a part of the diaphragm portion 834 and permits the diaphragm portion 834 to see the pressure only on the unsupported portion. The need to limit the travel of the diaphragm member 832 in order to minimize the extent of the unsupported portion of the diaphragm portion 834 requires a precise relationship between the diaphragm portion 834 and the solenoid 854. This is readily accomplished through the precise assembly of the diaphragm member 832 and the armature 840 as previously described.

The operation of the solenoid valve 800 is thus relatively insensitive to pressure on the diaphragm portion 834 as a result of the small movement of the diaphragm member 832.

Figure 17:
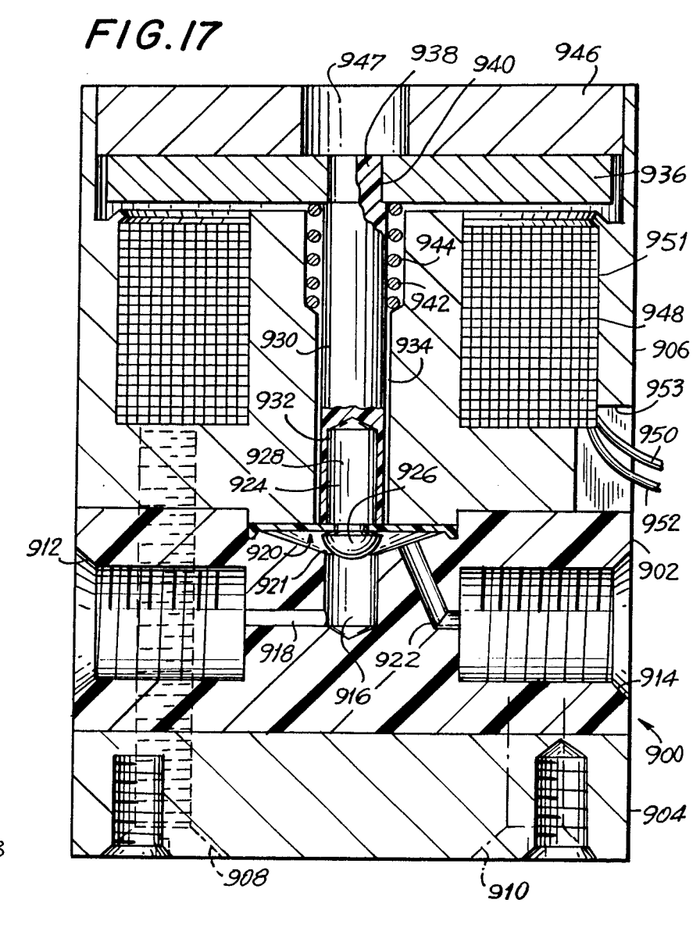
FIG. 17 is a cross-sectional view of still another embodiment of the invention showing a normally open valve.

FIG. 17 shows an additional embodiment 900 of the invention. The embodiment 900 is a normally open solenoid valve which comprises a valve body 902 which is mounted between a bottom plate 904 and a core member 906 by means of a plurality of machine screws two of which are shown by way of example by the broken lines 908, 910 in FIG. 17. The valve body 902, the bottom plate 904, and the core member 906, are each generally cylindrical in configuration.

The valve body 902 includes a left port 912 and a right port 914. The designations left port 912 and right port 914 relate to the orientation of the solenoid valve assembly 900 as shown in FIG. 17 and these designations have been made only by way of example. The left port 912 communicates with a central bore 916 via a horizontal conduit 918. The central bore 916 communicates with a valve cavity 920, the configuration of which has been previously shown in FIG. 15, and the valve cavity 920 communicates with the right port 914 by means of an angled conduit 922. Valve seat 921 is formed by the intersection of the tapered portion of valve cavity 920 and central bore 916.

A diaphragm member 924 is provided which is generally similar to the diaphragm member 832 which was previously described. The diaphragm member 924 has an integrally formed poppet portion 926 and an integrally formed shaft portion 928. The shaft portion 928 is connected to an extension shaft 930 by being force fit into a bore 932 in the extension shaft. The extension shaft 930 projects upward through a bore 934 which is formed in the core 906 member and is connected to an armature disk 936 by means of a shaft end 938 which is force fit into a central bore 940 in the armature disk 936.

The upper portion 942 of the bore 934 has an enlarged diameter which accommodates a helical spring 944. The helical spring 944 urges the armature disk 936 upward until the armature disk bears against a mounting plate 946 which is connected to the core member 906 in a conventional manner. The mounting plate 946 includes an inspection aperture 947. In the upper position of the armature disk 936, which is shown in FIG. 17, the poppet portion 926 of the diaphragm member 924 is held away from the valve seat 921 thereby permitting communication between the left port 912 and the right port 914 of the valve body 902.

The solenoid valve 900 includes a solenoid coil 948 which is disposed in a cavity 951 formed in the core member 906. When the solenoid coil is energized via the leads 950, 952 the armature disk 936 is drawn toward the solenoid coil 948 overcoming the force of the helical spring 944 and causing the poppet portion 926 to come into contact with the valve seat 920, thereby closing the solenoid valve 900. The leads 950, 952 pass through an aperture 953 which is formed in the core member 906.

In the embodiment 900 the extension shaft is made of non-magnetic material and the diaphragm member 924 is made of material having suitable flexibility such as a plastic material, e.g. Delrin.

It is noted that the valve body and diaphragm may be made of various materials depending on the application. Thus, the valve body and diaphragm may be made of Teflon or KEL-F material where harsh chemicals are to be handled. However, in less demanding applications the valve body can be made of metal such as stainless steel, brass or aluminum, and the diaphragm may be made of rubber.

Although the solenoid valves according to the present invention have been described as controlling fluids it should be understood that these valves may also be used for controlling gases.

While preferred embodiments of the invention have been shown and described herein, it is obvious that numerous additions, changes and omissions may be made in such embodiments without departing from the spirit and scope of the invention.

What is claimed is:

1. A solenoid valve comprising a valve body having a valve cavity,
   first port means disposed on said valve body and communicating with said valve cavity,
   second port means disposed on said valve body and communicating with said valve cavity,
   an orifice member having an orifice, with said orifice member mounted in said valve cavity and disposed separating said first and second ports,
   electrically operated solenoid means mounted on said valve body and including a solenoid coil and armature means disposed for actuation by said solenoid coil,
   diaphragm means mounted in said valve cavity,
   poppet means formed as part of said diaphragm means with said poppet means operative to close said orifice,
   with said diaphragm means and said poppet means comprising an integrally formed unitary member and with said poppet means comprising a semi-spherical end portion and a conical portion with said conical portion having a larger diameter and a smaller diameter and with said larger diameter of said conical portion disposed adjacent said semi-spherical end portion, and said smaller diameter disposed adjacent said diaphragm,
   resilient means mounted in said valve cavity and disposed to bear on said diaphragm means and bias said diaphragm means and said poppet means in a first direction,
   pressure plate means disposed in said valve cavity and supporting a portion of said diaphragm means thereby enhancing the ability of said diaphragm means to withstand fluid pressure and with said solenoid means capable of biasing said diaphragm and poppet means in a second direction which is opposite to said first direction.

2. A solenoid valve according to claim 1 in which said resilient means are disposed to bias said diaphragm means and said poppet means toward a normally closed position and in which said armature means are actuated by said solenoid means to force said diaphragm and said poppet means toward an open position.

3. A solenoid valve according to claim 1 in which said poppet means are centrally located on said diaphragm means.

4. A solenoid valve according to claim 1 in which said diaphragm means is circular.

5. A solenoid valve according to claim 1 in which said semi-spherical end portion includes a semi-spherical surface.

6. A solenoid valve according to claim 1 in which the intersection of said poppet means and said diaphragm means comprises an undercut portion with said undercut directed inwardly of said poppet means.

7. A solenoid valve according to claim 1 further, comprising a spring seat member disposed between said resilient means and said diaphragm means.

8. A solenoid valve according to claim 7 in which said spring seat member includes a semi-spherical surface disposed bearing against said diaphragm means with said spring seat member capable of lateral motion relative to said valve body.

9. A solenoid valve according to claim 1 in which said resilient means comprises a helical compression spring.

10. A solenoid valve according to claim 1 in which said diaphragm means further includes a sealing lip formed on the peripheral surface of said diaphragm means.

11. A solenoid valve according to claim 10 in which said sealing lip is circular and in which said poppet means is centrally disposed with respect to said diaphragm and centrally disposed with respect to said sealing lip.

12. A solenoid valve according to claim 11 in which said valve body comprises a sealing groove portion disposed to receive said sealing lip.

13. A solenoid valve according to claim 11 in which said sealing lip has a V shaped cross-section.

14. A solenoid valve according to claim 1 in which said pressure plate means comprises a pressure plate disposed adjacent said diaphragm means with said pressure plate having an aperture through which said armature means pass in order to bear against said diaphragm means.

15. A solenoid valve according to claim 1 further comprising a second orifice member having an orifice, second diaphragm means and second poppet means with said second diaphragm means and said second poppet means disposed to close said orifice on said second orifice member, and connecting means connecting said first and said second poppet means.

16. A solenoid valve according to claim 15 in which said connecting means comprises a shaft member.

17. A solenoid valve according to claim 15 in which said first and second poppet means are disposed to simultaneously close said orifice on said orifice member while opening said orifice on said second orifice member and simultaneously open said orifice on said orifice member while closing said orifice on said second orifice member 18. A solenoid valve according to claim 15 further including a third port and internal passages disposed to permit flow between said first port and said third port, while preventing flow through said second port while said poppet means are in a first position, and to permit flow between said third port and said second port and to prevent flow through said first port when said poppet means are in a second position.

19. A solenoid valve according to claim 1 further including a third port and a fourth port, second diaphragm means and second poppet means, a second orifice member each of said orifice members having an orifice, a pressure bar disposed below two of said diaphragm means and a pair of force balls bearing on said two diaphragm means and activator means bearing on a central portion of said pressure bar to cause said force balls to bear against said diaphragm means for the purpose of operating said poppet means to simultaneous control flow between said first and second ports and between said third and fourth ports.

20. A solenoid valve according to claim 1 further comprising a second valve cavity and a third valve cavity, a total of three diaphragm assemblies disposed on each in said valve cavities, and pressure plate means disposed between said diaphragm means and said diaphragm assemblies for simultaneous operation of said three diaphragm assemblies.

21. A solenoid valve according to claim 20 in which each of said three valve cavities includes three valve ports.

22. A solenoid valve according to claim 1 in which said resilient means comprises a helical spring.

23. A solenoid valve according to claim 1 in which said armature means comprises a disc of magnetically permeable material.

24. A solenoid valve according to claim 1 including solenoid coil means comprising a cylindrical solenoid coil.

25. A solenoid valve according to claim 24 in which said armature means comprises a disc having a diameter substantially equal to the outer diameter of said solenoid coil.

26. A solenoid valve according to claim 1 in which said resilient means are disposed to bias said diaphragm means and said poppet means toward a normally open position and in which said armature means are actuated by said solenoid means to force said diaphragm means and said poppet means toward a closed position.

* * * * *